U S010921999B2

(12) United States Patent
Moschopoulos et al.

(10) Patent No.: US 10,921,999 B2
(45) Date of Patent: Feb. 16, 2021

(54) INITIALIZATION OF MEMORY IN A COMPUTER SYSTEM

(71) Applicant: Dialog Semiconductor B.V., 's-Hertogenbosch (NL)

(72) Inventors: Nikolaos Moschopoulos, Athens (GR); Dimitrios Papadopoulos, Patras (GR); Jakko Verhallen, Oss (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 15/389,535

(22) Filed: Dec. 23, 2016

(65) Prior Publication Data
US 2017/0199696 A1 Jul. 13, 2017

(30) Foreign Application Priority Data
Dec. 30, 2015 (DE) .......................... 10 2015 226 837

(51) Int. Cl.
| G06F 15/177 | (2006.01) |
| G06F 9/00 | (2006.01) |
| G06F 9/24 | (2006.01) |
| G06F 3/06 | (2006.01) |
| G06F 9/4401 | (2018.01) |
| G06F 1/3287 | (2019.01) |

(52) U.S. Cl.
CPC .......... *G06F 3/0632* (2013.01); *G06F 1/3287* (2013.01); *G06F 3/0604* (2013.01); *G06F 3/0625* (2013.01); *G06F 3/0658* (2013.01); *G06F 3/0679* (2013.01); *G06F 9/4418* (2013.01); *Y02D 10/00* (2018.01)

(58) Field of Classification Search
CPC ...... G06F 3/0632; G06F 15/00; G06F 3/0679; G06F 3/0658; G06F 1/3287; G06F 3/0625; G06F 3/0604
See application file for complete search history.

(56) References Cited

U.S. PATENT DOCUMENTS

| 6,230,274 B1 * | 5/2001 | Stevens | G06F 11/1441 710/10 |
| 2006/0168461 A1 * | 7/2006 | Allen | G06F 1/3203 713/300 |
| 2013/0346733 A1 * | 12/2013 | Groot | G11C 7/20 713/1 |

* cited by examiner

*Primary Examiner* — Xuxing Chen
(74) *Attorney, Agent, or Firm* — Saile Ackerman LLC; Stephen B. Ackerman

(57) ABSTRACT

A computer system, especially but not exclusively an embedded system, is provided with a CPU and an external FLASH or other memory which is used for storing code to be executed by the CPU in operation of the system. The system can be initialized without requiring a secondary boot sequence which means it can be used in preference to embedded or serial FLASH solutions. There is provided a computer system comprising: a processor; an external memory, being external to the processor; a memory controller for the external memory; and a power management unit which is arranged to receive a wake up signal, then to first wake up the memory controller; and secondly at a later time to wake up the processor.

8 Claims, 5 Drawing Sheets

INITIALIZATION OF MEMORY IN A COMPUTER SYSTEM

TECHNICAL FIELD

The present disclosure relates to apparatus and methods for initialization of non-volatile memory in a computer system which comprises a processor alongside the memory.

BACKGROUND

A processor in a computer system is arranged to carry out various operations, which may include one or more of basic arithmetical, logical, control and input/output (I/O) operations. A processor that can carry out all these types of operation is commonly referred to as a central processing unit (CPU) and comprises an arithmetic logic unit (ALU), registers, a control unit, and in some cases cache memory. The processor (via the control unit in the case of a CPU) fetches instructions from a memory for execution to be executed for various purposes such as initialization of the system or the running of a program.

An area of increasing attention is that of embedded systems. An embedded system is a computer system with a dedicated function which may function as part of a larger mechanical or electrical system.

Embedded systems are a key part of enabling the so-called "internet of things" (IoT), referring to a concept where objects that are were not traditionally seen as computers or computing devices are equipped with embedded systems that enable the objects to collect and exchange data. As well as including the incorporation of embedded systems into existing everyday objects, the term IoT also includes new and future technologies such as microelectromechanical (MEMS) and nanotechnology devices, smart dust or similar scale sensor nodes.

The IoT has created the need for small and very low power devices that can eventually connect anything on a protocol backbone or a portable computing device (such as a smartphone or tablet). Protocols used for IoT applications take advantage of the capability of such devices to stay idle for long periods of time while being active for only a short time interval just enough to communicate the usually little amounts of data towards the backbone or the portable computing device.

To achieve ultra-low power while in the active times, deeply embedded systems comprise an embedded or serial non-volatile memory (NVM), commonly FLASH, to sustain code and important data. However, FLASH processes in deep-submicron are quite expensive, while FLASH cells increase the die size considerably thus increasing the silicon cost.

An alternative approach is to use a processor and a memory that is provided externally from the processor, usually as a discrete component. This architecture provides the same performance as with an embedded NVM memory, while also allowing for an expandable memory size since it is an external discrete component.

However, in this type of arrangement, the memory needs to be initialized before code can be executed by the processor. The need for initialization causes a delay and increases the risk of the system crashing.

Such a system will also usually comprise a memory controller, which manages the storage of data in the memory array and exchanges data between the processor and the memory. As well as the memory itself, the controller also needs to be initialized before the processor can execute code.

FIG. 1 shows an example of a prior art embedded system, in which a system on chip (SoC) 100 is provided with an external FLASH memory 102. A FLASH controller 106 governs communication between a CPU 104 and the memory 102. The SoC 100 is also provided with a power management unit (PMU) 108 which can receive a wake-up signal when the system is asleep or powered off.

During the sleep time of the system, the memory 102 may be totally powered off, or set in a deep power down mode with low leakage current dissipation. When the system wakes up, the memory 102 has to get ready for code retrieval by the processor 104. The controller 106 also has to be configured to perform the memory initialization. A specific command or sequence of commands may be needed to put the system into a particular data transmission mode, or to release the device from a power down mode to a normal mode of operation.

Moreover, since different memory vendors use their own opcodes for various commands, a hardwired implementation would lack flexibility.

The controller 106 itself needs to retain vital configurations if powered down during sleep. That requires retention registers keeping their programming values so that upon wakeup, the controller knows what to do.

SUMMARY

According to a first aspect of the disclosure there is provided a computer system comprising: a processor; an external memory, being external to the processor; a memory controller for the external memory; and a power management unit which is arranged to receive a wake up signal, then to first wake up the memory controller; and secondly at a later time to wake up the processor.

Optionally, the controller is arranged to initialize the external memory before the processor is woken by the power management unit.

Optionally, the computer system further comprises a command memory storing memory initialization instructions for the external memory; and wherein the memory controller is arranged to fetch the memory initialization instructions from the command memory when it is woken by the wake up signal received from the power management unit.

Optionally, the memory controller comprises a working memory for storing the memory initialization instructions.

Optionally, the controller comprises a hardware state machine for initializing the external memory.

Optionally, the processor, command memory, power management unit and memory controller are provided as component parts of the same integrated circuit.

Optionally, the external memory is a FLASH memory or other EEPROM.

According to a second aspect of the disclosure there is provided a method of transitioning a computer system from a sleep or powered-down state to a powered-up state, wherein the computer system comprises a processor, an external memory being external to the processor, a power management unit and a memory controller, the method comprising: receiving, at the power management unit, a wake-up request; waking up the memory controller; then, at a later time, waking up the processor.

Optionally, the method comprises initializing the external memory after waking up the memory controller and before waking up the processor.

Optionally, initializing the external memory comprises fetching memory initialization instructions from a command memory and loading them to the memory controller.

Optionally, initializing the external memory comprises sending commands to the external memory using a hardware state machine.

Optionally, after the processor is woken up, it takes over and exchanges data with the external memory.

BRIEF DESCRIPTION OF THE DRAWINGS

The disclosure will now be described, by way of example only, with reference to the accompanying drawings, in which.

DESCRIPTION

Figure 1:
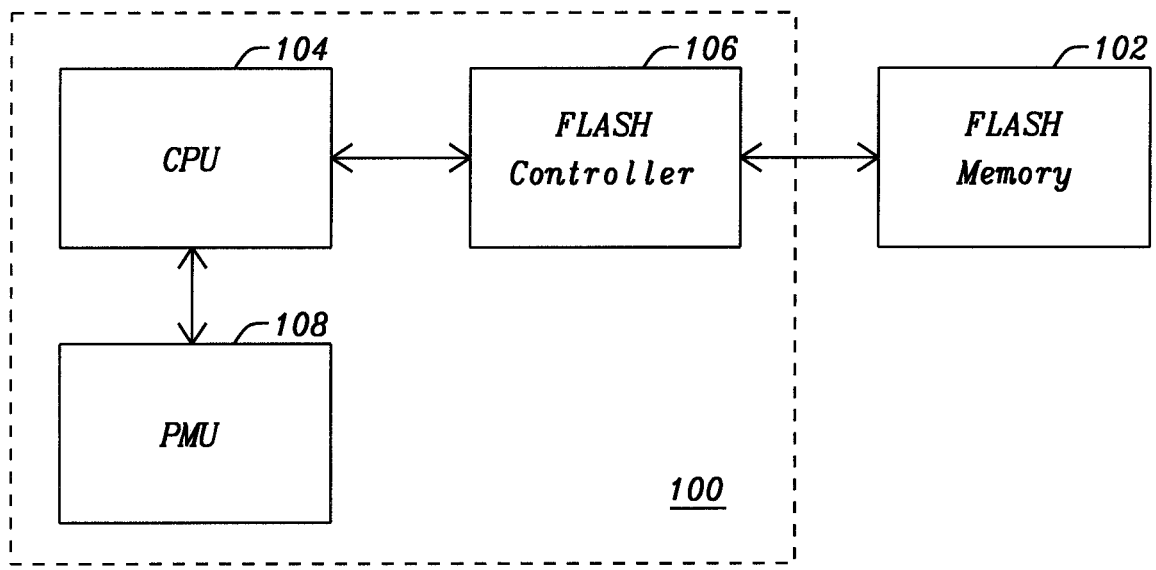
FIG. 1 shows an example of a prior art embedded system, in which a system on chip (SoC) is provided with an external FLASH memory.
Figure 2:
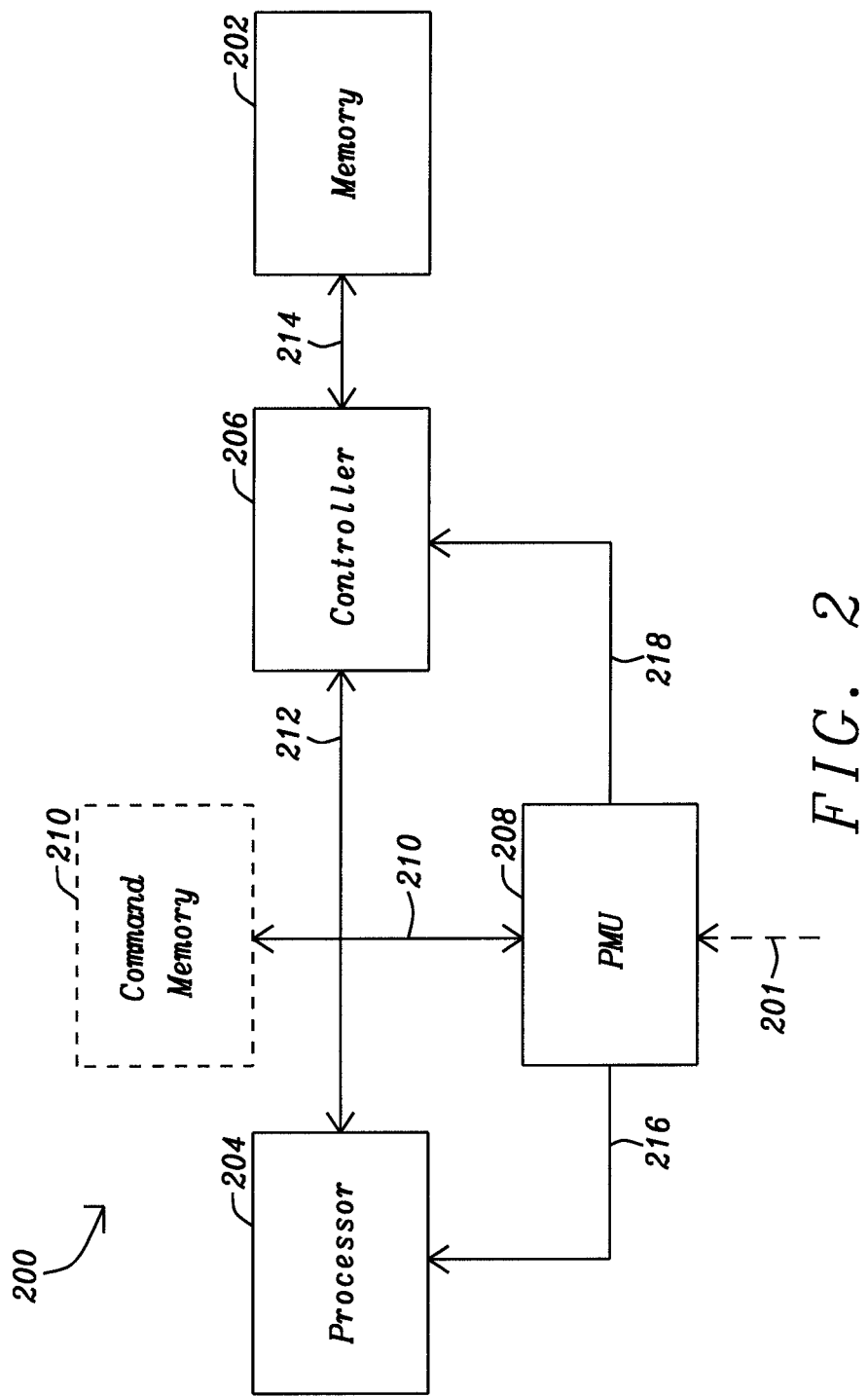
FIG. 2 illustrates an embodiment of an embedded system according to the present disclosure.

FIG. 2 illustrates a system 200 according to an embodiment of the disclosure. A processor 204 fetches instructions from a memory 202 which in a preferred embodiment is a non-volatile memory (NVM). A memory controller 206 configures the memory 202 and interfaces with the processor 204. The components are linked by data buses 210, 212, 214 and a power management unit (PMU) 208 is provided which sends wake up signals 216, 218 to the processor 204 and controller 206 respectively.

The disclosure is not limited to any particular architecture but in an example implementation, the processor 204, controller 206, PMU 208 and optional command memory 210 are all provided as part of the same SoC, and the memory 202 is provided as a separate discrete component, external to the SoC.

The processor 204 and PMU 208 are shown as separate components but they could alternatively be provided as part of a combined component, that is, the PMU could incorporate the processor 204 or vice versa. Similarly, the controller 206 could be provided as part of the SoC, or it could be integrated together with the memory 202 in which case the memory 202 and controller 206 are together provided as a discrete component, external to the SoC.

The PMU is arranged to receive a wake-up signal from an external source or system. It may also comprise more sophisticated components that provide one or more power management functions such as battery management, voltage regulation and charging functions.

A command memory 210 is provided which may store instructions for use by the controller 206, including code for initializing the controller 206. The command memory 210 is illustrated as an optional component because it is also possible for the required instructions to be stored in the main memory 202.

Figure 3:
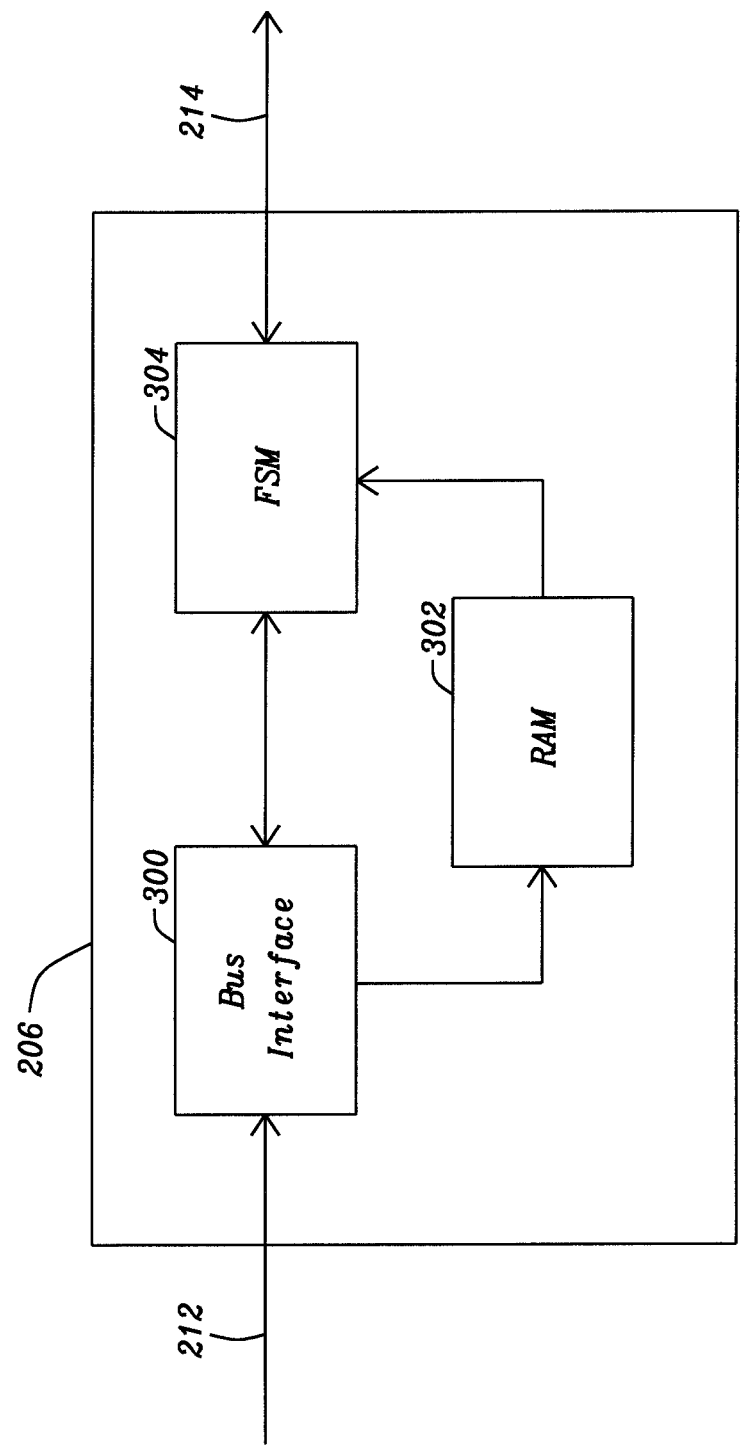
FIG. 3 illustrates an embodiment of a controller which can be used in the system of FIG. 2.

FIG. 3 shows an example embodiment of a controller 206 for use with the system of FIG. 2. As seen in FIG. 2, the controller 206 exchanges data with the processor 204, PMU 208 and command memory 210 via data bus 212, and exchanges data with the memory 202 via data bus 214. The controller 206 comprises a bus interface 300, a memory 302, and a finite state machine (FSM) 304. The memory 302 preferably comprises an appropriate random access memory (RAM). The FSM 304 changes state depending on the inputs it receives from the bus interface 300 and the RAM 302 and in a preferred embodiment is implemented in hardware. The FSM comprises any suitable circuit that can change state depending on the inputs.

It is possible that the memory 202 will be either totally powered off, or set into deep power down mode when the system goes to a sleep mode (of any type), especially if the controller 206 is used as part of an ultra low power SoC. However, upon power-up or wake-up, the memory 202 requires a number of commands to get to a state where the processor 204 can actually execute code. This initialization should be done prior to the processor 204 wakeup.

When the PMU 208 receives an interrupt 201 or other wake up signal, it restores power and sends a wake up command 218 to the controller 206. The controller 206 then obtains initialisation commands from the memory 210 and loads them into its operating memory 302, which may suitably take the form of a retainable first-in first-out (FIFO) buffer or other suitable memory structure. The command memory 210 may be a suitable kind of non-volatile storage, such as a one-time programmable (OTP) read only memory (ROM), and can be pre-programmed, for example during product line testing.

The controller 206 then decodes the commands in the RAM 302 into memory commands of an appropriate format and then initializes the memory 202. As shown in FIG. 3, the controller 206 may comprise a hardware state machine 304 which can perform the decoding and initialization functions.

Following initialization of the memory 202, the PMU 208 sends a wake up commend 216 to the processor 204 indicating that the memory 202 is now ready for code execution by the processor 204. The processor 204 then takes over and starts fetching code from the memory 202.

As mentioned above, in an alternative embodiment the initialization commands can be stored directly in the memory 202 instead of in a dedicated command memory 210. Instructions for retrieval of the commands can be hard-coded in the controller.

The PMU informs both the controller 206 and the processor 204 that the system is to be woken up, but not at the same time. By ensuring the memory is initialized before the processor 204 wakes up, it appears to the processor 204 as if the memory 202 did not go to sleep at all and instructions can be fetched by the processor 204 as soon as it is started. No secondary loaders are required to take care of the initialization procedure.

Also, the processor 204 does not need to intervene in the initialization of the memory 202. Instead, a very small (in comparison to the processor) dedicated hardware state machine 304 or equivalent is provided which performs the initialization, so there is a power saving as compared with intervention of a processor.

The disclosure also provides great flexibility because all commands including settling wait states can be programmed in the RAM 302 of the controller 206.

Furthermore, retainable registers or RAM are provided to store the memory initialization micro-code in the controller even if a power island that supplies the controller is totally shut off.

There are many types of systems, memories and communications technologies to which the present disclosure can be applied. However, to further enhance the understanding of the disclosure, FIG. 4 illustrates, for example only, one particular embodiment of the disclosure, in which the memory is a quad serial peripheral interface (QSPI) FLASH memory.

Figure 4:
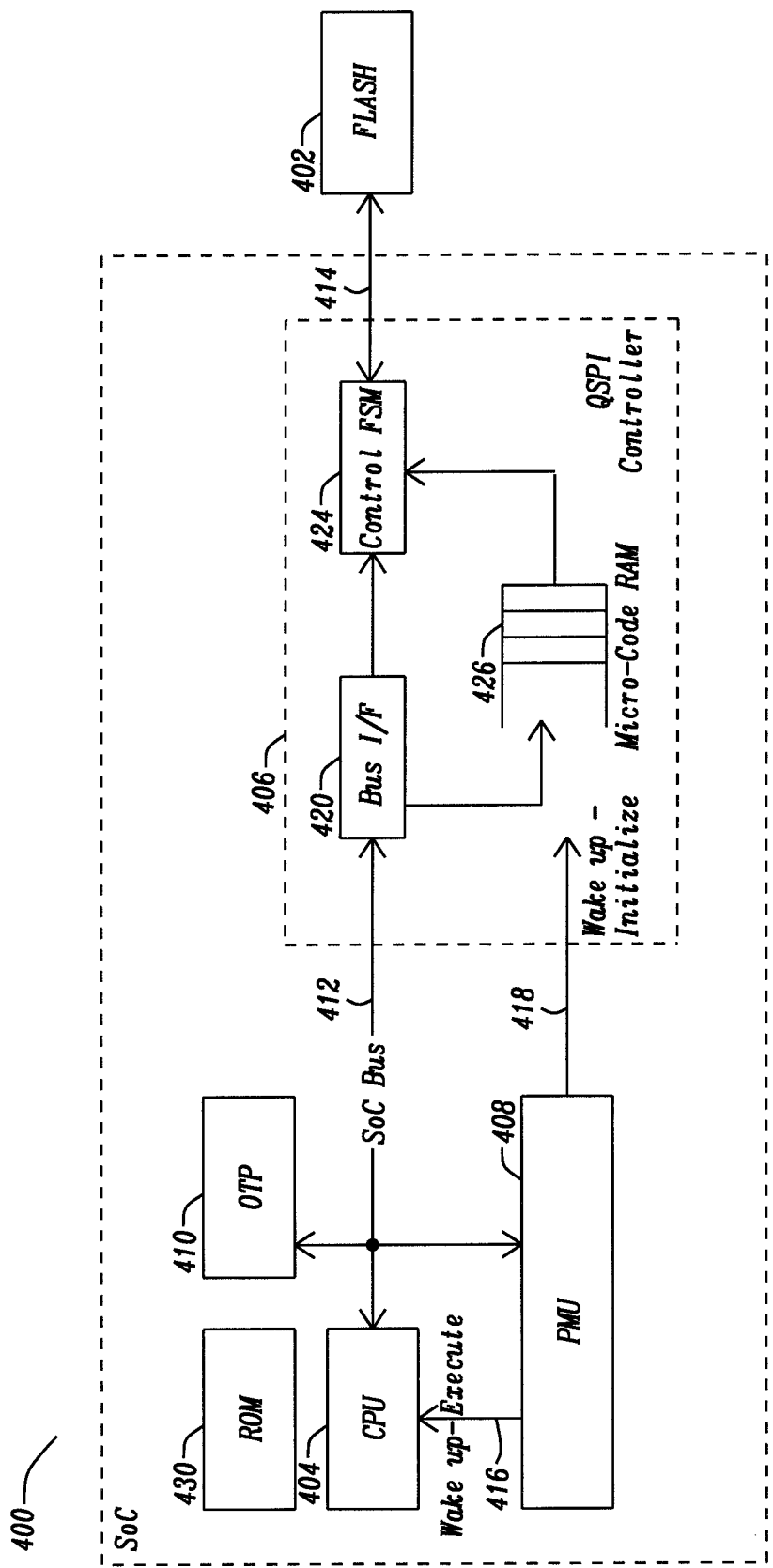
FIG. 4 illustrates an embedded system according to a further embodiment of the present disclosure.

As shown in FIG. 4, an SoC 400 comprises a central processing unit (CPU) 404 which fetches instructions from a quad serial peripheral interface (QSPI) FLASH memory 402 which is provided externally to the SoC 400. A QSPI interface comprises four bidirectional input and output data signals between master and slave, which are usually labelled as IOU through 103. The QSPI controller 406 comprises a bus interface 420, micro-code RAM 426 and hardware state machine (control FSM) 424. The SoC also comprises a read only memory (ROM) designed to operate with the CPU 404 for the performance of a particular function for which the SoC is provided.

The principles of operation of the system of FIG. 4 is similar to that described above with reference to FIGS. 2 and 3, except that FIG. 4 provides more details of a specific optional implementation. Initialization micro-codes are stored at the SOC 400 in a one-time programmable (OTP) memory 410. When the PMU 408 receives an interrupt or is otherwise instructed to initiate wake up, it sends a wake up signal 418 to the QSPI controller 406. The controller 406 then fetches the micro-codes stored in the OTP 410 and stores them in its micro-code RAM 426, which in this example is a FIFO memory buffer. Then, the hardware state machine 424 decodes the commands residing in the FIFO 426 and initializes the QSPI FLASH 402 automatically.

Once the QSPI FLASH 402 is initialised, the PMU 408 sends a wake up signal 416 to the CPU 404, indicating that the QSPI FLASH 402 is available for execution of code. The CPU 404 then takes over and starts fetching code from the QSPI FLASH memory 402.

An embodiment of the micro-code could look as depicted in the following table:

TABLE 1 micro-code embodiment

| Bit | Name | Description |
|---|---|---|
| | | Byte 0 |
| 7:3 | CMD_BYTES | The number of payload bytes to be sent |
| 2:1 | CMD_TX_MD | QSPI bus mode when transmitting the command: 0x0: single SPI 0x1: Dual SPI 0x2: Quad SPI 0x3: Reserved |
| 0 | CMD_VALID | 1: the command record is valid 0: the command record is not valid |
| | | Byte 1 |
| 7:0 | CMD_WT_CNT_LS | Number of clock cycles to wait after applying the command (least significant byte) |
| 7:0 | CMD_WT_CNT_MS | Number of clock cycles to wait after applying the command (most significant byte) |
| | | Byte 3 to (CMD_NBYTES+2) |
| | | The actual data bytes to be sent within a QSPI Chip Select envelope signal |

The first byte (LSByte) in the word of the FIFO contains the flag of the command being valid or not, the bus mode of operation and the number of bytes contained in the payload to be sent.

The second and third byte define the amount of clock cycles that the QSPI Controller has to wait after applying the command. Depending on the clock period, if more time is required by the FLASH until it is settled, then multiple identical commands might be issued.

EXAMPLE

Considering 0xAB to be the opcode for releasing the FLASH from deep power down mode, the FIFO would be initialized with the following sequence:

TABLE 2

Micro-code example

| Byte | Value | Description |
|---|---|---|
| 0 | 0x11 | Valid command record, single SPI mode, 2 bytes of payload |
| 1 | 0x01 | wait for 1 clock cycle after command is sent |
| 2 | 0x00 | |
| 3 | 0xAB | Actual QSPI FLASH command opcode. This opcode means "release from power down mode" |

It will be appreciated that the embodiment of FIG. 4 is for the purposes of illustration and many variations can be considered. For example the interface may be a regular SPI or an inter-integrated circuit (I2C) interface and the memory may be of a different type.

Figure 5:
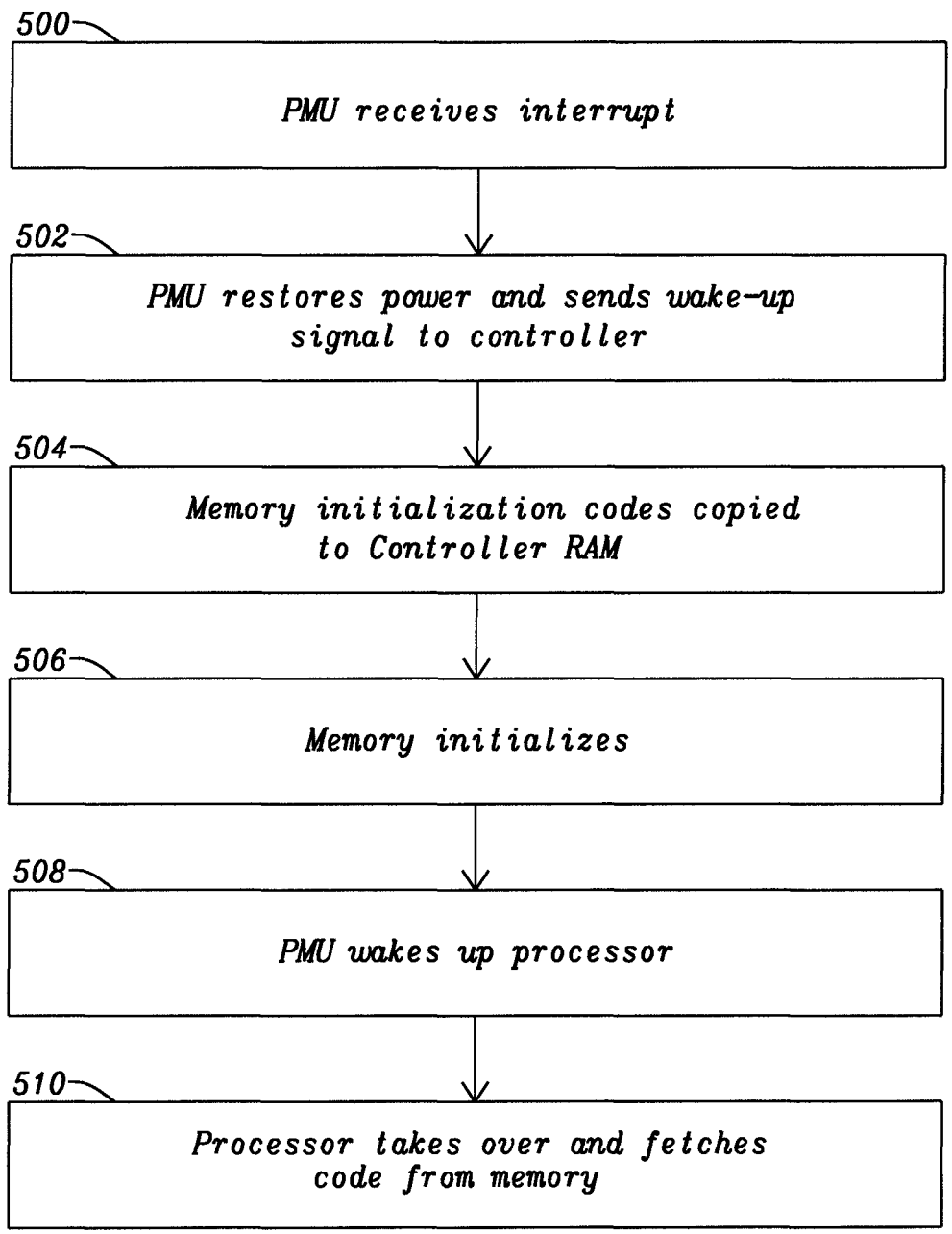
FIG. 5 illustrates a method of system initialization according to the disclosure.

The present disclosure also relates to a method initializing a computer system, which is consistent with the capabilities of the embodiments described above. The method is also a method of transitioning a computer system from a sleep or powered-down state to a powered-up state. The method is illustrated in the flow chart of FIG. 5. Here it can be seen that, at step 500, the PMU receives an interrupt, or an equivalent instruction to initiate a system wake-up. The PMU then restores power and sends a wake-up signal to a controller (step 502) after which the memory initialization micro-codes are loaded into the controller RAM (step 504) and the memory initializes (step 506). The PMU then wakes up the processor (step 508), which then takes over and fetches code from the memory (step 510).

Various improvements and modifications may be made to the above without departing from the scope of the disclosure.

What is claimed is:

1. An embedded computer system comprising:
   a processor;
   an external non-volatile memory, being external to the processor;
   a memory controller for the external non-volatile memory; and:
   a power management unit; wherein:
   the memory controller comprise:
      a working memory for storing the memory initialization instructions; and
      a finite state machine for initializing the external non-volatile memory;
   said system being arranged to carry out the following steps in order:
      the power management unit receives a wake up signal;
      the power management unit wakes up the memory controller;
      the memory controller initializes the external non-volatile memory by:

i) decoding the memory initialization instructions using the finite state machine; and:
ii) initializing the external non-volatile memory using the finite state machine; and:
the power management unit wakes up the processor.

2. The computer system of claim 1, further comprising a command memory storing memory initialization instructions for the external non-volatile memory; and wherein the memory controller is arranged to fetch the memory initialization instructions from the command memory when it is woken by the wake up signal received from the power management unit.

3. The computer system of claim 2, wherein the processor, command memory, power management unit and memory controller are provided as component parts of the same integrated circuit.

4. The computer system of claim 1, wherein the external non-volatile memory is a FLASH memory or other EEPROM.

5. A method of transitioning an embedded computer system from a sleep or powered-down state to a powered-up state, wherein the computer system comprises a processor, an external non-volatile memory being external to the processor, a power management unit and a memory controller, the memory controller comprising a working memory for storing memory initialization instructions and a finite state machine for initializing the external non-volatile memory, the method comprising the following steps in order:
receiving, at the power management unit, a wake-up request;
waking up the memory controller;
initializing the external non-volatile memory by decoding the memory initialization instructions using the finite state machine and initializing the external non-volatile memory using the finite state machine; and
waking up the processor.

6. The method of claim 5, wherein initializing the external non-volatile memory comprises fetching memory initialization instructions from a command memory and loading them to the memory controller.

7. The method of claim 5, wherein initializing the external non-volatile memory comprises sending commands to the external non-volatile memory using a hardware state machine.

8. The method of claim 5, wherein, after the processor is woken up, it takes over and exchanges data with the external non-volatile memory.

* * * * *